US010607565B2

(12) United States Patent
Aoki (10) Patent No.: US 10,607,565 B2
(45) Date of Patent: Mar. 31, 2020

(54) INFORMATION PROCESSING DEVICE AND METHOD FOR ENABLING UPDATE IN CONVERTOR THAT CONNECTS WITH FIRST DISPLAY DEVICE WITHOUT CONNECTING FIRST DISPLAY DEVICE

(71) Applicant: Fujitsu Client Computing Limited, Kanagawa (JP)

(72) Inventor: Noriyuki Aoki, Kanagawa (JP)

(73) Assignee: FUJITSU CLIENT COMPUTING LIMITED, Kanagawa (JP)

(*) Notice: Subject to any disclaimer, the term of this patent is extended or adjusted under 35 U.S.C. 154(b) by 0 days.

(21) Appl. No.: 16/439,939

(22) Filed: Jun. 13, 2019

(65) Prior Publication Data
US 2019/0295501 A1   Sep. 26, 2019

Related U.S. Application Data

(63) Continuation of application No. PCT/JP2017/044169, filed on Dec. 8, 2017.

(30) Foreign Application Priority Data

Jan. 25, 2017 (JP) ................. 2017-011314

(51) Int. Cl.
*G09G 5/00* (2006.01)
*G06F 8/65* (2018.01)
*G06F 3/14* (2006.01)

(52) U.S. Cl.
CPC ........... *G09G 5/006* (2013.01); *G06F 3/1423* (2013.01); *G06F 8/65* (2013.01); *G09G 2360/04* (2013.01); *G09G 2370/04* (2013.01)

(58) Field of Classification Search
CPC ......... G06F 3/1423; G06F 8/65; G09G 5/006; G09G 2360/04; G09G 2370/04
(Continued)

(56) References Cited

U.S. PATENT DOCUMENTS

2002/0005840 A1* 1/2002 Wicker .................... G09G 1/16
345/204
2006/0181480 A1* 8/2006 Yee ......................... G09G 5/006
345/3.1
(Continued)

FOREIGN PATENT DOCUMENTS

JP        2005242294 A     9/2005
JP        2013140571 A     7/2013
(Continued)

OTHER PUBLICATIONS

International Search Report issued in corresponding application No. PCT/JP2017/044169 dated Feb. 13, 2018 (3 pages).

*Primary Examiner* — Jacinta M Crawford
(74) *Attorney, Agent, or Firm* — Osha Liang LLP (57) ABSTRACT

An information processing device includes: a convertor that executes a control program to convert an input video signal, and, when having received a first notification querying for a connection state of the first display device and having detected a resistance value corresponding to a state where a first display device is connected on a path connected with the first display device, transmits a second notification; a display controller that transmits the first notification to the convertor when having received an instruction to update the control program, and updates the control program when having received the second notification as a response to the first notification; and a resistance changer that connects a dummy resistor to the path and causes the path to have the resistance value corresponding to the state when the resistance value corresponding to the state is not detected on the path.

4 Claims, 8 Drawing Sheets

(58) Field of Classification Search
USPC .................................................. 345/1.1, 204
See application file for complete search history.

(56) References Cited

U.S. PATENT DOCUMENTS

| | | |
|---|---|---|
| 2013/0169876 A1 | 7/2013 | Ko et al. |
| 2013/0290946 A1 | 10/2013 | Iwadate |
| 2014/0071494 A1 | 3/2014 | Inoue |

FOREIGN PATENT DOCUMENTS

| | | |
|---|---|---|
| JP | 2013232100 A | 11/2013 |
| JP | 201452888 A | 3/2014 |
| JP | 2015109114 A | 6/2015 |

* cited by examiner

INFORMATION PROCESSING DEVICE AND METHOD FOR ENABLING UPDATE IN CONVERTOR THAT CONNECTS WITH FIRST DISPLAY DEVICE WITHOUT CONNECTING FIRST DISPLAY DEVICE

CROSS-REFERENCE TO RELATED APPLICATIONS

This application is a continuation of PCT International Application No. PCT/JP2017/044169 filed on Dec. 8, 2017 which claims the benefit of priority from Japanese Patent Application No. 2017-011314 filed on Jan. 25, 2017, the entire contents of which are incorporated herein by reference.

FIELD

The present invention relates to an information processing device and a method of controlling the information processing device.

BACKGROUND

Recently, a large number of information processing devices having the function of a graphic functional card exist. In addition, display signals for performing screen display on a monitor or the like of such an information processing device have been digitalized. The information processing device configured to output a digital display signal includes, for example, a port compliant with a display port (DP). Through the display signal digitalization, a signal compatible with a video graphic array (VGA) interface has become less likely to be directly output from a graphic chip which is set for graphics output. The VGA interface is also called an analog RGB (red, green, and blue) interface.

However, the use frequency of an analog VGA input display by a user of the information processing device remains high. To handle such a situation, it is typical to mount, on the information processing device, a DP-to-VGA conversion chip as an integrated circuit (IC) configured to perform protocol conversion from a signal compliant with a display port to a signal compliant with analog VGA. Accordingly, the information processing device can be connected with a display including the VGA interface by using a cable through which an RGB signal is transmitted and received without using a table with which a signal compliant with a display port is converted into an RGB signal.

The DP-to-VGA conversion chip has firmware. It is preferable to update the firmware of the DP-to-VGA conversion chip at manufacturing of the information processing device on which the DP-to-VGA conversion chip is mounted or in case of trouble of the DP-to-VGA conversion chip. The firmware of the DP-to-VGA conversion chip is updated by using a tool provided by the manufacturer of the DP-to-VGA conversion chip. Many of such tools update the firmware through an application programming interface (API) compatible with an operating system (OS) application. Thus, the firmware update is often affected by restriction due to the API.

When the firmware is updated through the API, a device ID (Identifier) as a double (D) WORD identifier is specified to specify a port as the target of the firmware update. The graphic chip acquires the device ID through another API. When a display is connected in advance before the device ID is acquired through the API, a unique DWORD identifier indicating the display is returned to the graphic chip. Thus, the display needs to be connected when a firmware update API is used.

The following specifically describes the process of firmware update. The graphic chip receives an instruction to update the firmware of the DP-to-VGA conversion chip from a central processing unit (CPU). Subsequently, the graphic chip executes EnumAttachableDevices Method as a command for determining a port connected with a display. When a display is connected, the graphic chip acquires a value indicated by a DWORD pointer as a unique identifier. Thereafter, the graphic chip inputs the acquired identifier as a device ID, and in addition, inputs data of a firmware for update. Thereafter, the graphic chip updates the firmware of the DP-to-VGA conversion chip by using the device ID and the firmware for update.

In a technology of converting a digital signal of display data into an analog signal, a plurality of gradation voltages provided with gamma correction are generated, and one of the gradation voltages is selected and provided with D/A conversion. In a conventional technology of software update, connection is automatically established with a server storing update data, and update is automatically performed.

Examples of conventional techniques are Japanese Laid-open Patent Publication No. 2015-109114 and Japanese Laid-open Patent Publication No. 2005-242294.

However, connecting a display to an information processing device needs work and is cumbersome when updating the firmware of a DP-to-VGA conversion chip.

In the conventional technology in which conversion to an analog signal is performed by using gradation voltages provided with gamma correction, chip firmware update is not considered, and thus it is difficult to reduce work at update. In the conventional technology in which connection is automatically established with a server to perform update, a display is connected when updating the firmware of a DP-to-VGA conversion chip, and thus it is difficult to reduce work at the time of the update.

SUMMARY

According to one aspect of an information processing device, and a method of controlling the information processing device disclosed herein, a convertor includes a path to be connected with a first display device, and that executes a control program to convert an input video signal as a digital signal into an analog signal and output the converted signal, and, when having received a first notification querying for a connection state of the first display device and having detected a resistance value corresponding to a state where the first display device is connected on the path, transmits a second notification that the first display device is connected. A display controller outputs the video signal as the digital signal to the convertor, transmits the first notification to the convertor when having received an instruction to update the control program, and updates the control program when having received, from the convertor, the second notification as a response to the transmitted first notification. A resistance changer connects a dummy resistor to the path to cause the path to have the resistance value corresponding to the state where the first display device is connected when the resistance value corresponding to the state where the first display device is connected is not detected on the path by the conversion unit.

According to one aspect of the present invention, work at the time of firmware update can be reduced.

DETAILED DESCRIPTION

Embodiments of an information processing device and a method of controlling the information processing device, which are disclosed in the present application will be described below in detail with reference to the accompanying drawings. The embodiments described below do not limit the information processing device and the method of controlling the information processing device disclosed in the present application.

First Embodiment

Figure 1:
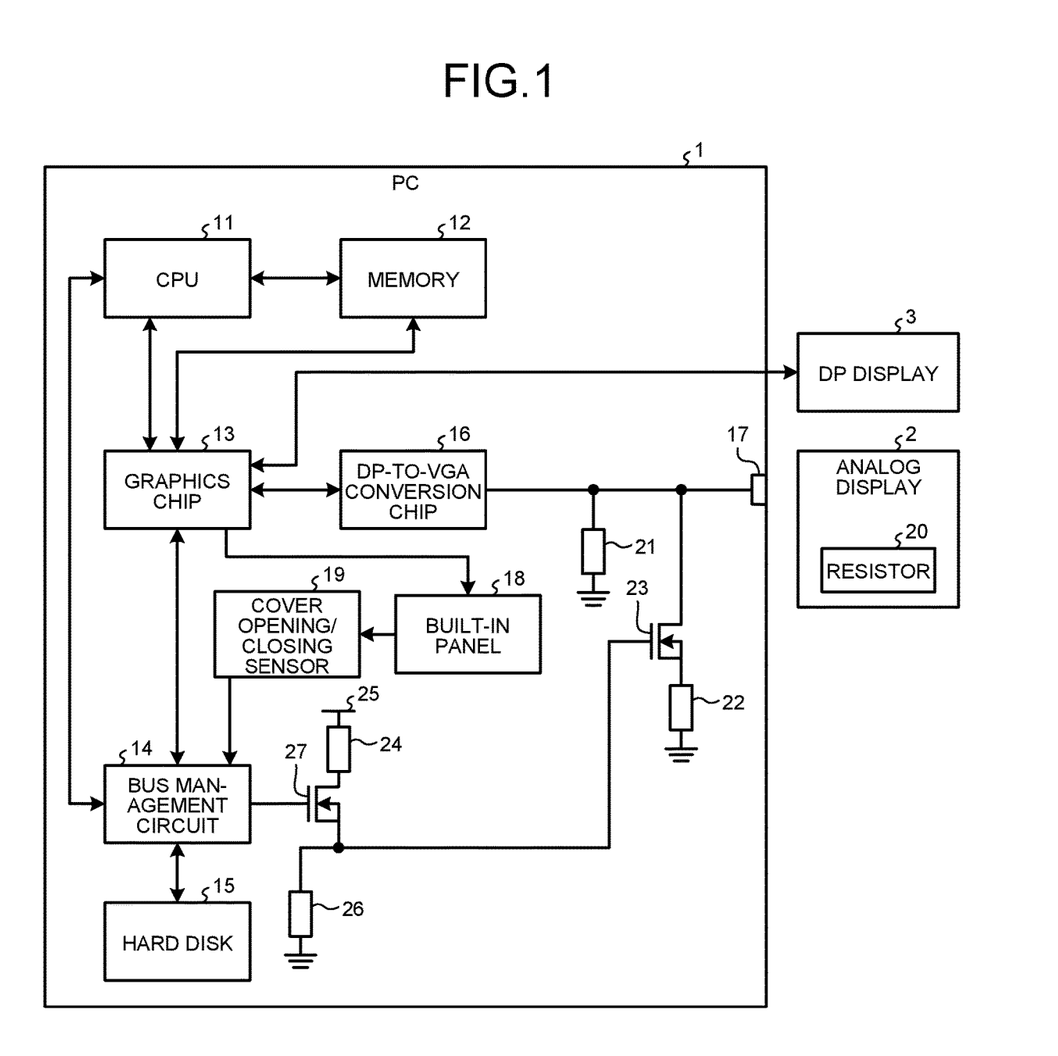
FIG. 1 is a block diagram of an information processing device according to a first embodiment.

FIG. 1 is a block diagram of an information processing device according to a first embodiment. The first embodiment describes a case in which the information processing device is a laptop personal computer (PC).

In the present embodiment, there are an analog display 2 and a DP display 3 to be connected with the PC 1. In FIG. 1, the PC 1 is connected with the DP display 3. In FIG. 1, the PC 1 is not connected with the analog display 2.

The analog display 2 includes an RGB signal input interface. In addition, the analog display 2 includes a resistor 20. In the present embodiment, the resistor 20 has a resistance value of 75Ω. The analog display 2 corresponds to an exemplary "first display device".

The analog display 2 is connected with a VGA port 17 included in the PC 1 to be described later. When the analog display 2 is connected with the VGA port 17, the resistor 20 is connected with a path extending from the VGA port 17 to a DP-to-VGA conversion chip 16 to be described later. Then, the analog display 2 displays an image based on an RGB signal input from the PC 1.

The DP display 3 includes an input-output interface of a display port signal as a video signal compliant with a display port. The DP display 3 is connected with the PC 1 in FIG. 1, but is detachable from the PC 1.

The DP display 3 is connected with a port of the PC 1, which is compliant with a display port standard. The DP display 3 displays an image based on a display port signal input from the PC 1.

The PC 1 includes a CPU 11, a memory 12, a graphics chip 13, the DP-to-VGA conversion chip 16, a bus management circuit 14, a hard disk 15, and the VGA port 17. The PC 1 as a laptop personal computer also includes a built-in panel 18. The PC 1 also includes a cover opening/closing sensor 19. In addition, the PC 1 includes a resistor 21, a dummy resistor 22, a field effect transistor (FET) switch 23, a resistor 24, a pull-up power source 25, a resistor 26, and a FET switch 27.

The CPU 11 is an arithmetic processing device. The CPU 11 operates an OS, and further operates an application on the OS. The CPU 11 receives input of an instruction to update firmware of the DP-to-VGA conversion chip 16. Then, when not connected with the analog display 2, the CPU 11 activates an automatic mode switching tool configured to update the firmware by using the dummy resistor 22, and notifies the bus management circuit 14 of automatic mode switching execution. Subsequently, the CPU 11 outputs a command to update the firmware of the DP-to-VGA conversion chip 16 to the graphics chip 13 by using an application operating on the OS. The firmware of the DP-to-VGA conversion chip 16 is an example of a "control program".

Upon receiving, from the bus management circuit 14, a cover open notification that a closed cover of the laptop PC 1 is opened, the CPU 11 determines whether a predetermined time has elapsed since the analog display 2 is connected. In the present embodiment, the CPU 11 determines whether the predetermined time of one second or longer has elapsed. When one second or longer has elapsed, the CPU 11 outputs, to the graphics chip 13, an instruction to switch a video signal output destination to the built-in panel 18. This operation is processing based on such a specification of the OS operated by the CPU 11 in the present embodiment that, when the closed cover is opened after the predetermined time or longer has elapsed since the analog display 2 is connected, it is determined that a built-in display is newly added, and display is returned to the built-in panel 18.

The memory 12 stores a basic input output system (BIOS) and firmware for updating the DP-to-VGA conversion chip 16.

The graphics chip 13 includes a plurality of ports connected with a video display device. The graphics chip 13 achieves each above-described function by, for example, reading a computer program that achieves the function from the hard disk 15 through the bus management circuit 14 and executing the computer program.

The graphics chip 13 receives an instruction from the CPU 11 and displays video on the built-in panel 18, the DP display 3, the analog display 2, or the like connected with a port included therein. In addition, the graphics chip 13 manages the DP-to-VGA conversion chip 16.

The graphics chip 13 receives, from the CPU 11, input of the command to update the firmware of the DP-to-VGA conversion chip 16. Then, the graphics chip 13 checks a port connected with the analog display 2 among ports included therein. The graphics chip 13 queries the DP-to-VGA conversion chip 16 for whether the analog display 2 is connected. This query for whether the analog display 2 is connected is an example of a "first notification".

Thereafter, when the analog display 2 is connected, the graphics chip 13 acquires a response indicating the connection of the analog display 2 from the DP-to-VGA conversion chip 16. The response indicating the connection of the analog display 2 is an example of a "second notification".

When the analog display 2 is connected, the graphics chip 13 issues a display ID as a DOWRD identifier to the analog display 2. Thereafter, the graphics chip 13 executes a firmware update tool by using the display ID. By executing the firmware update tool, the graphics chip 13 acquires the firmware of the DP-to-VGA conversion chip 16 from the memory 12. Then, the graphics chip 13 updates the firmware of the DP-to-VGA conversion chip 16 by using the acquired firmware.

When the analog display 2 is not connected, in other words, when no response indicating the connection of the analog display 2 is received, the graphics chip 13 notifies the bus management circuit 14 of non-connection of the analog display 2. Thereafter, the graphics chip 13 checks a port connected with the analog display 2 among the ports included therein again. In this case, the graphics chip 13 acquires a response notifying the connection of the analog display 2 from the DP-to-VGA conversion chip 16 as described later. Then, the graphics chip 13 issues a display ID as a DOWRD identifier to the analog display 2. Thereafter, in this case, although the analog display 2 is actually not connected with the VGA port 17, the graphics chip 13 determines that the analog display 2 is connected, and transmits a video signal to the analog display 2.

The graphics chip 13 holds a screen display setting when the previous firmware update is performed. The screen display setting is setting for determining whether to perform, when firmware update is executed, single screen display in which a screen is displayed only on the analog display 2 or double screen display in which a display different from the analog display 2 is used. When firmware update is performed, the graphics chip 13 performs screen display in accordance with the screen display setting used in the previous update.

For example, when the screen display setting used in the previous update is the double screen display, the graphics chip 13 transmits a video signal to the built-in panel 18 or the like in addition to the analog display 2. In this case, an operator can check an update operation screen through the built-in panel 18 or the like, and perform an operation to update the firmware of the DP-to-VGA conversion chip 16.

When the screen display setting used in the previous update is the single screen display, the graphics chip 13 transmits a video signal only to the analog display 2, which is actually not connected. Thus, in this case, to check the update operation screen, the operator manually switches the screen display setting so that the update operation screen is displayed on the built-in panel 18.

The graphics chip 13 receives an instruction to update the firmware of the DP-to-VGA conversion chip 16 from the operator through the update operation screen. Then, the graphics chip 13 executes the firmware update tool by using the issued display ID. By executing the firmware update tool, the graphics chip 13 acquires the firmware of the DP-to-VGA conversion chip 16 from the memory 12. Then, the graphics chip 13 updates the firmware of the DP-to-VGA conversion chip 16 by using the acquired firmware. Thereafter, the graphics chip 13 notifies the bus management circuit 14 that the update of the firmware of the DP-to-VGA conversion chip 16 is completed.

When having received, from the CPU 11, an instruction to switch the video signal output destination to the built-in panel 18 upon opening of the cover, the graphics chip 13 outputs a video signal to the built-in panel 18 in accordance with the instruction. The graphics chip 13 is an example of a "display controller" and of a "display control circuit".

The bus management circuit 14 is, for example, a platform controller hub (PCH). The bus management circuit 14 relays data forwarding between the CPU 11 or the graphics chip 13 and the hard disk 15.

The bus management circuit 14 receives a signal input from the cover opening/closing sensor 19 and checks whether the cover is open or closed. When having detected that the closed cover is open based on the signal input from the cover opening/closing sensor 19, the bus management circuit 14 outputs a cover open notification to the CPU 11.

In addition, the bus management circuit 14 receives a notification of execution of the automatic mode switching from the CPU 11. Thereafter, when having received a notification of non-connection of the analog display 2 from the graphics chip 13, the bus management circuit 14 applies voltage to the gate of the FET switch 27 to turn on the FET switch 27 so that the PC 1 is transitioned to a firmware update mode. The bus management circuit 14 performs the voltage application to the gate of the FET switch 27 by using a general-purpose input/output (GPIO) signal. Thereafter, when having received a firmware update completion notification from the graphics chip 13, the bus management circuit 14 stops the voltage application to the gate of the FET switch 27 to turn off the FET switch 27 so that the PC 1 is transitioned to a normal mode. The bus management circuit 14 is an example of a "resistance changer" and an exemplary "management circuit".

The hard disk 15 is an auxiliary storage device. The hard disk 15 stores computer programs such as an OS and an application. In addition, the hard disk 15 stores various computer programs including a computer program that achieves the function of the graphics chip 13.

The VGA port 17 is a port to be connected with the analog display 2. When connected with the analog display 2, the VGA port 17 forwards, to the analog display 2, a signal output from the DP-to-VGA conversion chip 16.

The DP-to-VGA conversion chip 16 includes a path to be connected with the VGA port 17. When the VGA port 17 is connected with the analog display 2, the DP-to-VGA conversion chip 16 is connected with the analog display 2 through the VGA port 17. This path extending from the DP-to-VGA conversion chip 16 to the VGA port 17 corresponds to a "path to be connected with the first display device".

The path connecting the DP-to-VGA conversion chip 16 and the VGA port 17 is connected with one end of the resistor 21. In the present embodiment, the resistor 21 has a resistance of 75Ω. The other end of the resistor 21 is grounded.

In addition, the path connecting the DP-to-VGA conversion chip 16 and the VGA port 17 is connected with one end of the dummy resistor 22 through the FET switch 23. In the present embodiment, the dummy resistor 22 has a resistance of 75Ω. The other end of the dummy resistor 22 is grounded.

The DP-to-VGA conversion chip 16 receives input of a display port signal from the graphics chip 13. Then, the DP-to-VGA conversion chip 16 converts the display port signal into an RGB signal. Thereafter, the DP-to-VGA conversion chip 16 transmits the video signal converted into the RGB signal to the analog display 2 connected with the VGA port 17.

When the firmware of the DP-to-VGA conversion chip 16 is to be updated, the DP-to-VGA conversion chip 16 receives, from the graphics chip 13, a query for whether the analog display 2 is connected. Then, the DP-to-VGA conversion chip 16 measures the resistance of the path connected with the VGA port 17.

For example, when the analog display 2 is connected with the VGA port 17, the path connecting the DP-to-VGA conversion chip 16 and the VGA port 17 is connected in parallel with the resistor 21 and the resistor 20 included in the analog display 2. In this case, the DP-to-VGA conversion chip 16 measures the resistance value of the path connected with the VGA port 17 to be 37.5Ω. For example, when the analog display 2 is not connected with the VGA port 17 and the FET switch 23 is on, the path connecting the DP-to-VGA conversion chip 16 and the VGA port 17 is connected in parallel with the resistor 21 and the dummy resistor 22. In this case, the DP-to-VGA conversion chip 16 measures the resistance value of the path connected with the VGA port 17 to be 37.5Ω.

For example, when the analog display 2 is not connected with the VGA port 17 and the FET switch 23 is off, the path connecting the DP-to-VGA conversion chip 16 and the VGA port 17 is connected only with the resistor 21. In this case, the DP-to-VGA conversion chip 16 measures the resistance value of the path connected with the VGA port 17 to be 75Ω.

Then, the DP-to-VGA conversion chip 16 determines whether a measurement result of the resistance of the path connected with the VGA port 17 is equal to a predetermined resistance value. In the present embodiment, the DP-to-VGA conversion chip 16 determines whether the resistance of the path connected with the VGA port 17 is 37.5Ω.

When the resistance of the path connected with the VGA port 17 is 37.5Ω, the DP-to-VGA conversion chip 16 returns, to the graphics chip 13, a response notifying that the analog display 2 is connected.

When the resistance of the path connected with the VGA port 17 is not 37.5Ω, the DP-to-VGA conversion chip 16 returns, to the graphics chip 13, a response notifying that the analog display 2 is not connected. The DP-to-VGA conversion chip 16 is an example of a "convertor" and an example of a "conversion circuit".

The built-in panel 18 is a display built in the laptop PC 1. The built-in panel 18 displays an image based on a video signal input from the graphics chip 13. The built-in panel 18 is an example of a "second display device".

The cover opening/closing sensor 19 is a detector configured to sense opening/closing of the cover on which the built-in panel 18 is disposed. When the cover is opened, the cover opening/closing sensor 19 notifies the bus management circuit 14 of the opening of the cover. When the cover is closed, the cover opening/closing sensor 19 notifies the bus management circuit 14 of the closing of the cover.

The pull-up power source 25 is connected with a path extending from the gate of the FET switch 23 through the resistor 24 and the FET switch 27. The pull-up power source 25 is a power source of 3.3 V. The resistor 24 has a resistance value of, for example, 4.7 kΩ.

The resistor 26 has one end connected with the path extending from the gate of the FET switch 23 in parallel to the resistor 24, the pull-up power source 25, and the FET switch 27. The other end of the resistor 26 is grounded. The resistor 26 has a resistance value of, for example, 47 kΩ.

When the PC 1 is in the firmware update mode, the FET switch 27 is turned on upon reception of the gate voltage application from the bus management circuit 14. When the PC 1 is in the normal mode, the FET switch 27 is turned off upon reception of the gate voltage application from the bus management circuit 14.

When the FET switch 27 is on, partial voltage due to the resistor 24 of the pull-up power source 25 and the resistor 26 is applied to the gate of the FET switch 23 as fixed voltage. Accordingly, the FET switch 23 is turned on, and the dummy resistor 22 is connected with the path connecting the DP-to-VGA conversion chip 16 and the VGA port 17. In other words, when the PC 1 is in the firmware update mode, the dummy resistor 22 is connected with the path connecting the DP-to-VGA conversion chip 16 and the VGA port 17.

When the FET switch 27 is off, the pull-up power source 25 is disconnected from the path extending from the gate of the FET switch 23, and thus the gate voltage of the FET switch 23 decreases to the voltage of the ground connected through the resistor 26. Accordingly, the FET switch 23 is turned off, and the dummy resistor 22 is disconnected from the path connecting the DP-to-VGA conversion chip 16 and the VGA port 17. In other words, when the PC 1 is in the normal mode, the dummy resistor 22 is disconnected from the path connecting the DP-to-VGA conversion chip 16 and the VGA port 17.

Figure 2:
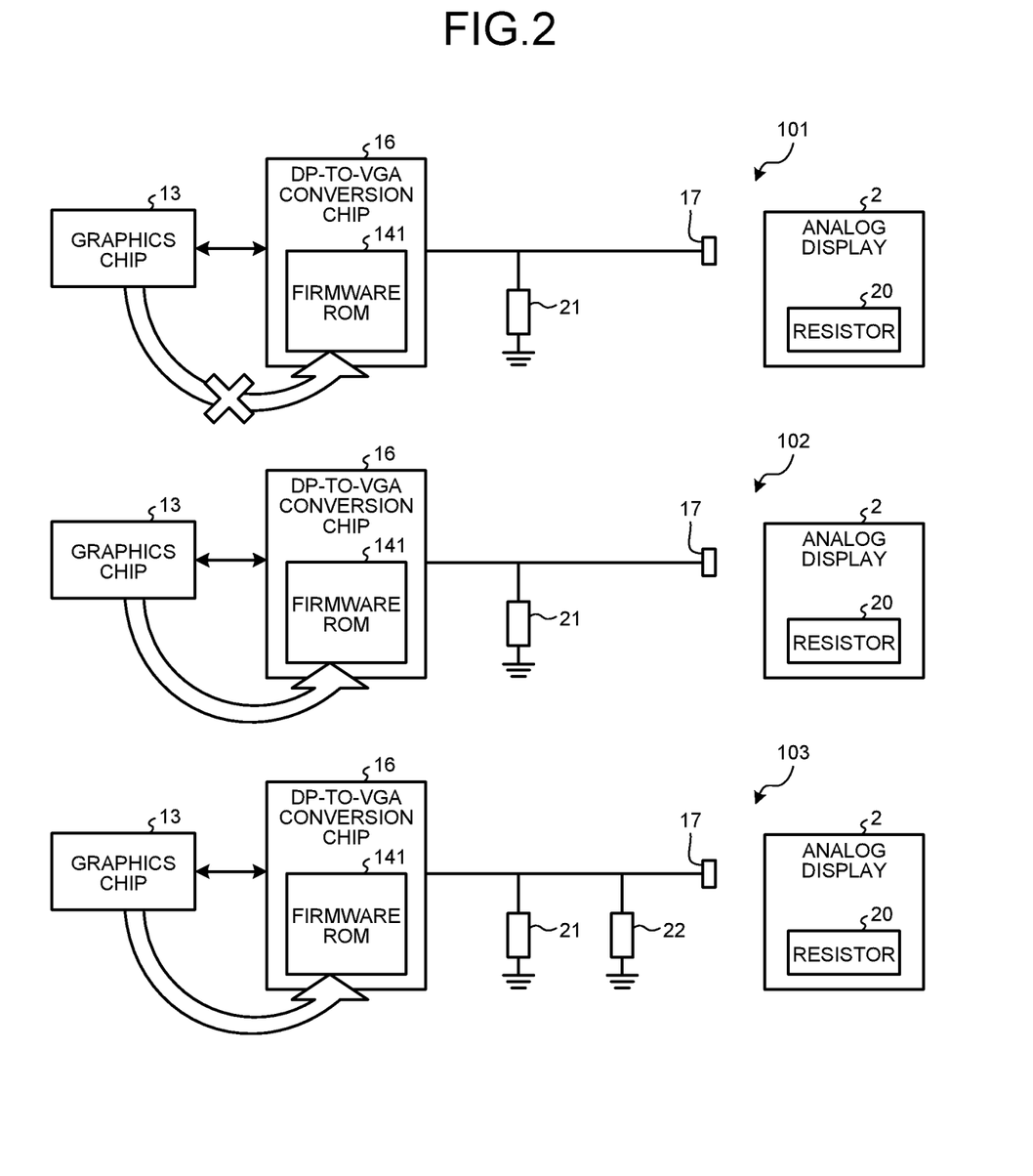
FIG. 2 is a diagram for describing firmware update in accordance with an operation mode and an analog display connection state.

The following describes, with reference to FIG. 2, firmware update of the DP-to-VGA conversion chip 16 in accordance with the operation mode of the PC 1 and the connection state of the analog display 2. FIG. 2 is a diagram for describing the firmware update in accordance with the operation mode and the connection state of the analog display. The DP-to-VGA conversion chip 16 includes a firmware ROM 141 as illustrated in FIG. 2. The graphics chip 13 updates the firmware of the DP-to-VGA conversion chip 16 by rewriting the firmware stored in the firmware ROM 141.

The connection state of the DP-to-VGA conversion chip 16 is illustrated as State 101 when the PC 1 is in the normal mode and the analog display 2 is not connected. In this case, the DP-to-VGA conversion chip 16 detects the resistance value 75Ω of the resistor 21 as the resistance value of the path connected with the VGA port 17. Then, the DP-to-VGA conversion chip 16 determines that the analog display 2 is not connected, and notifies the graphics chip 13 of the determination result. In this case, the graphics chip 13 does not rewrite the firmware ROM 141. In other words, the firmware of the DP-to-VGA conversion chip 16 is not updated.

When the PC 1 is in the normal mode and the analog display 2 is connected, the connection state of the DP-to-VGA conversion chip 16 is illustrated as State 102. In this case, the DP-to-VGA conversion chip 16 detects, as the resistance value of the path connected with the VGA port 17, the resistance value of 37.5Ω when the resistor 21 and the resistor 20 of the analog display 2 are connected in parallel with each other. Then, the DP-to-VGA conversion chip 16 determines that the analog display 2 is connected, and notifies the graphics chip 13 of the determination result. In this case, the graphics chip 13 rewrites the firmware ROM 141. In other words, the firmware of the DP-to-VGA conversion chip 16 is updated.

When the analog display 2 is not connected but the PC 1 is in the firmware update mode, the connection state of the DP-to-VGA conversion chip 16 is illustrated as State 103. In this case, the DP-to-VGA conversion chip 16 detects, as the resistance value of the path connected with the VGA port 17, the resistance value of 37.5Ω when the resistor 21 and the dummy resistor 22 are connected in parallel with each other. Then, the DP-to-VGA conversion chip 16 determines that the analog display 2 is connected, and notifies the graphics chip of the determination result. In this case, the graphics chip 13 rewrites the firmware ROM 141. In other words, the firmware of the DP-to-VGA conversion chip 16 is updated.

In this manner, when the analog display 2 is connected with the PC 1, the firmware of the DP-to-VGA conversion chip 16 is updated in the normal mode. When the analog display 2 is not connected with the PC 1, the firmware of the DP-to-VGA conversion chip 16 is updated in the firmware update mode. In other words, the PC 1 according to the present embodiment can update the firmware of the DP-to-VGA conversion chip 16 irrespective of the connection state of the analog display 2.

Figure 3:
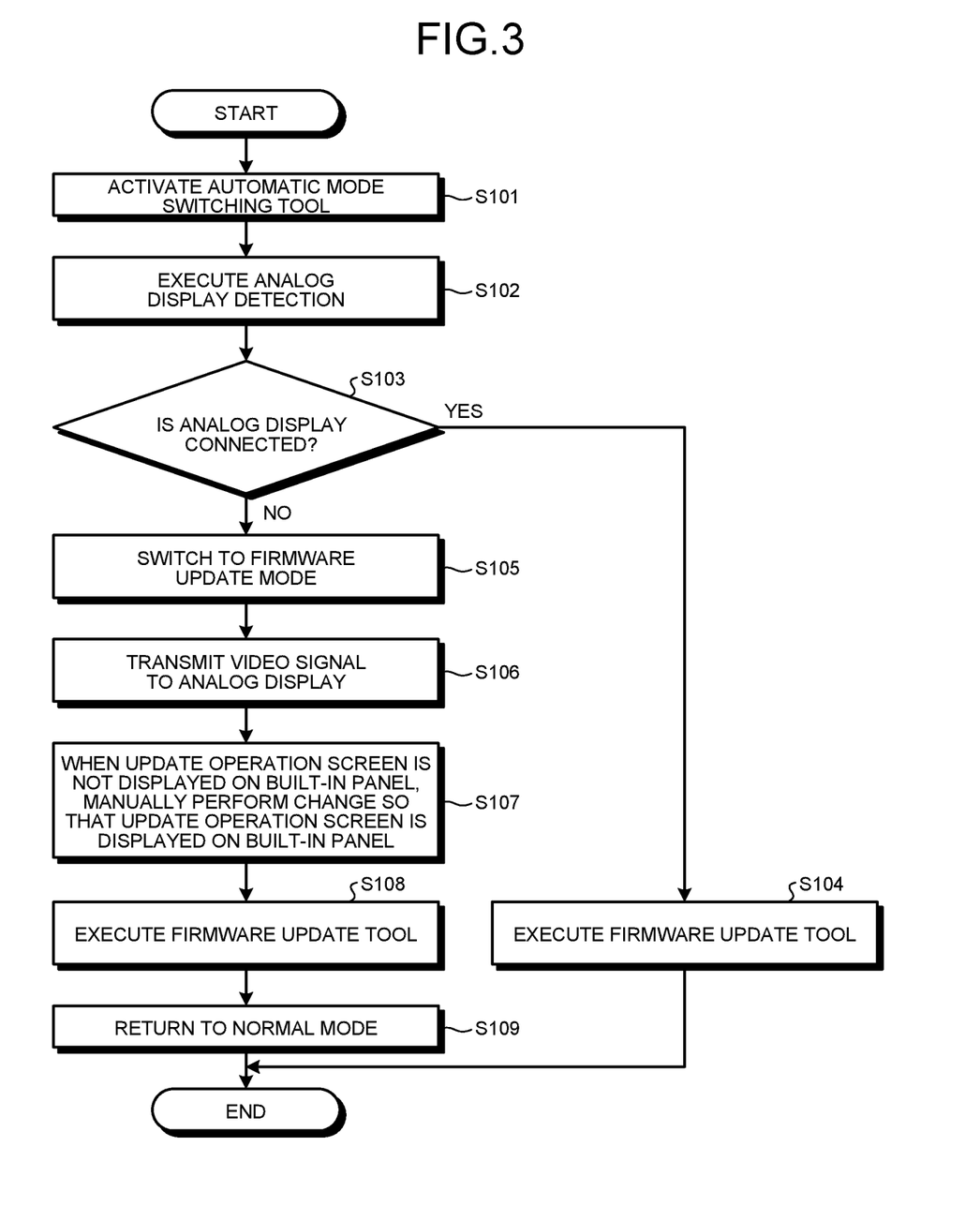
FIG. 3 is a flowchart of processing of updating firmware of a DP-to-VGA conversion chip according to the first embodiment.

The following describes, with reference to FIG. 3, the processing process of updating the firmware of the DP-to-VGA conversion chip 16 by the PC 1 according to the present embodiment. FIG. 3 is a flowchart of the processing of updating the firmware of the DP-to-VGA conversion chip according to the first embodiment.

The CPU 11 receives an instruction to update the firmware of the DP-to-VGA conversion chip 16 from the operator. Then, the CPU 11 activates the automatic mode switching tool (step S101), and instructs the bus management circuit 14 to execute the automatic mode switching. Thereafter, the CPU 11 outputs a command to update the firmware of the DP-to-VGA conversion chip 16 to the graphics chip 13.

The graphics chip 13 receives input of the command to update the firmware of the DP-to-VGA conversion chip 16 from the CPU 11. Then, the graphics chip 13 executes EnumAttachableDevices Method to execute detection of the analog display 2 (step S102). Specifically, the graphics chip 13 specifies a port connected with a device among the ports included therein, and queries whether the specified port is connected with the analog display 2. When any port is connected with the analog display 2, the graphics chip 13 receives, from the port, input of a response indicating the connection with the analog display 2.

The graphics chip 13 determines whether the analog display 2 is connected based on whether the response indicating the connection of the analog display 2 is received (step S103). When the analog display 2 is connected (positive determination at step S103), the graphics chip 13 issues a display ID as a DWORD identifier to the analog display 2. Then, the graphics chip 13 executes the firmware update tool by using the issued display ID (step S104). Specifically, the graphics chip 13 acquires the latest firmware of the DP-to-VGA conversion chip 16 stored in the memory 12, and rewrites the firmware stored in the firmware ROM 141 of the DP-to-VGA conversion chip 16 to the acquired firmware.

When the analog display 2 is not connected (negative determination at step S103), the graphics chip 13 notifies the bus management circuit 14 of the non-connection of the analog display 2. The bus management circuit 14 receives the notification of the non-connection of the analog display 2 from the graphics chip 13. Then, the bus management circuit 14 applies voltage to the gate of the FET switch 27. Accordingly, the FET switch 27 is turned on so that partial voltage of the pull-up power source 25 is applied to the gate of the FET switch 23, and the FET switch 23 is turned on so that the dummy resistor 22 is connected with the path connecting the DP-to-VGA conversion chip 16 and the VGA port 17. In other words, the bus management circuit 14 switches the operation mode of the PC 1 to the firmware update mode (step S105). Thereafter, the bus management circuit 14 notifies the graphics chip 13 of the switching to the firmware update mode.

The graphics chip 13 receives the notification of the switching to the firmware update mode from the bus management circuit 14. Then, the graphics chip 13 executes the EnumAttachableDevices Method again to execute detection of the analog display 2. Then, the graphics chip 13 receives, from the DP-to-VGA conversion chip 16, input of a response indicating the notification of the connection of the analog display 2. In this case, although the analog display 2 is actually not connected with the VGA port 17, the graphics chip 13 transmits a video signal to the analog display 2 (step S106) as if the analog display 2 is connected.

When the update operation screen is not displayed on the built-in panel 18 due to the screen display setting at the previous update, the operator manually changes the display screen setting so that the update operation screen is displayed on the built-in panel 18 (step S107). Thereafter, the operator inputs an instruction to update the firmware of the DP-to-VGA conversion chip 16 by using the update operation screen.

The graphics chip 13 receives the instruction to update the firmware of the DP-to-VGA conversion chip 16, and executes the firmware update tool (step S108).

Thereafter, the graphics chip 13 notifies the bus management circuit 14 that the update of the firmware of the DP-to-VGA conversion chip 16 is completed. The bus management circuit 14 receives, from the graphics chip 13, the notification that the update of the firmware of the DP-to-VGA conversion chip 16 is completed. Then, the bus management circuit 14 stops the voltage application to the gate of the FET switch 27. Accordingly, the FET switch 27 is turned off so that the pull-up power source 25 is disconnected from the path extending from the gate of the FET switch 23, and the gate voltage of the FET switch 23 decreases to the voltage of the ground. Then, the FET switch 23 is turned off so that the dummy resistor 22 is disconnected from the path connecting the DP-to-VGA conversion chip 16 and the VGA port 17. In other words, the bus management circuit 14 returns the operation mode of the PC 1 to the normal mode (step S109).

As described above, in the information processing device according to the present embodiment, the dummy resistor is connected with the path extending from the DP-to-VGA conversion chip when no analog display is connected at update of the firmware of the DP-to-VGA conversion chip. Accordingly, the information processing device performs pseudo detection of an analog display, and updates the firmware of the DP-to-VGA conversion chip. Thus, it is possible to omit work of connecting an analog display to the information processing device at update of the firmware of the DP-to-VGA conversion chip. In other words, it is possible to reduce the operator's work at update of the firmware.

(Modification)

The following describes a modification of the first embodiment. The present modification is different from the first embodiment in that the operator manually performs switching of the operation mode to the firmware update mode. The PC 1 according to the present modification is also illustrated in FIG. 1. The operation of each component same as that in the first embodiment will not be described below.

In the present embodiment, the CPU 11 does not instruct the bus management circuit 14 to execute the automatic mode switching. Thus, the bus management circuit 14 does not switch the PC 1 to the firmware update mode when notified of non-connection of the analog display 2.

When having received no response on the connection state of the analog display 2, the graphics chip 13 notifies the operator of non-connection of the analog display 2 on a display. For example, the graphics chip 13 causes a currently used display such as the built-in panel 18 to display information notifying non-connection of the analog display 2.

When notified of non-connection of the analog display 2, the operator manually switches the operation mode of the PC 1 to the firmware update mode by using a jumper switch or the like. In other words, through an operation by the operator, gate voltage is applied to the FET switch 27 so that the dummy resistor 22 is connected with the path connecting the DP-to-VGA conversion chip 16 and the VGA port 17. Thereafter, the operator again instructs the CPU 11 to update the firmware of the DP-to-VGA conversion chip 16.

Accordingly, the graphics chip 13 detects the analog display 2 while the dummy resistor 22 is connected with the path connecting the DP-to-VGA conversion chip 16 and the VGA port 17, and thus checks pseudo connection of the analog display 2. Accordingly, the graphics chip 13 can update the firmware of the DP-to-VGA conversion chip 16.

Figure 4:
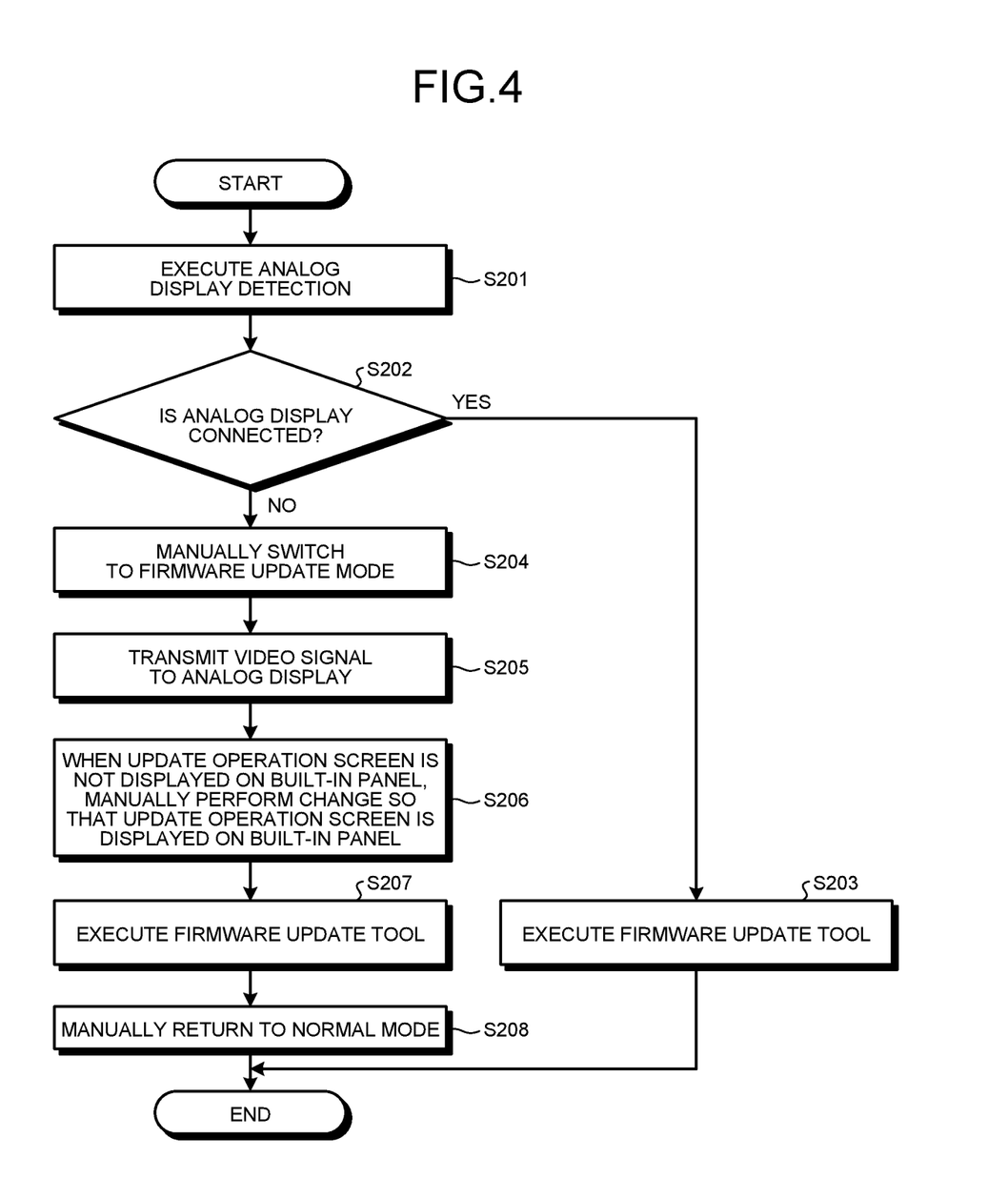
FIG. 4 is a flowchart of processing of updating firmware of the DP-to-VGA conversion chip according to a modification of the first embodiment.

The following describes the processing process of updating the firmware of the DP-to-VGA conversion chip 16 according to the present modification with reference to FIG. 4. FIG. 4 is a flowchart of the processing of updating the firmware of the DP-to-VGA conversion chip according to the modification of the first embodiment.

The CPU 11 receives an instruction to update the firmware of the DP-to-VGA conversion chip 16 from the operator. Then, the CPU 11 outputs a command to update the firmware of the DP-to-VGA conversion chip 16 to the graphics chip 13. The graphics chip 13 receives input of the command to update the firmware of the DP-to-VGA conversion chip 16 from the CPU 11. Then, the graphics chip 13 executes EnumAttachableDevices Method to execute detection of the analog display 2 (step S201).

The graphics chip 13 determines whether the analog display 2 is connected based on whether the response indicating the connection of the analog display 2 is received (step S202). When the analog display 2 is connected (positive determination at step S202), the graphics chip 13 issues a display ID as a DWORD identifier to the analog display 2. Then, the graphics chip 13 executes the firmware update tool by using the issued display ID (step S203).

When the analog display 2 is not connected (negative determination at step S202), the graphics chip 13 notifies the operator of the non-connection of the analog display 2 through, for example, display on the built-in panel 18. The operator manually changes the operation mode of the PC 1 to the firmware update mode by using a jumper switch or the like (step S204). Accordingly, voltage is applied to the gate of the FET switch 27. Then, the FET switch 27 is turned on so that partial voltage of the pull-up power source 25 is applied to the gate of the FET switch 23, and the FET switch 23 is turned on so that the dummy resistor 22 is connected with the path connecting the DP-to-VGA conversion chip 16 and the VGA port 17. Thereafter, the operator again instructs the CPU 11 to update the firmware of the DP-to-VGA conversion chip 16.

The CPU 11 receives the instruction to update the firmware of the DP-to-VGA conversion chip 16 from the operator. Then, the CPU 11 outputs a command to update the firmware of the DP-to-VGA conversion chip 16 to the graphics chip 13. The graphics chip 13 receives input of the command to update the firmware of the DP-to-VGA conversion chip 16 from the CPU 11. The graphics chip 13 executes the EnumAttachableDevices Method again to execute detection of the analog display 2. Then, the graphics chip 13 receives, from the DP-to-VGA conversion chip 16, input of a response indicating the notification of the connection of the analog display 2. In this case, although the analog display 2 is actually not connected with the VGA port 17, the graphics chip 13 transmits a video signal to the analog display 2 (step S205) as if the analog display 2 is connected.

When the update operation screen is not displayed on the built-in panel 18 due to the display screen setting at the previous update, the operator manually changes the display screen setting so that the update operation screen is displayed on the built-in panel 18 (step S206). Thereafter, the operator inputs an instruction to update the firmware of the DP-to-VGA conversion chip 16 by using the update operation screen.

The graphics chip 13 receives the instruction to update the firmware of the DP-to-VGA conversion chip 16, and executes the firmware update tool (step S207).

Thereafter, the graphics chip 13 notifies the operator that the update of the firmware of the DP-to-VGA conversion chip 16 is completed through, for example, display on the built-in panel 18. The operator receives the update completion notification and manually returns the operation mode of the PC 1 to the normal mode by using a jumper switch or the like (step S208). Accordingly, the application of the gate voltage of the FET switch 27 is stopped. the FET switch 27 is turned off so that the pull-up power source 25 is disconnected from the path extending from the gate of the FET switch 23, and the gate voltage of the FET switch 23 decreases to the voltage of the ground. Then, the FET switch 23 is turned off so that the dummy resistor 22 is disconnected from the path connecting the DP-to-VGA conversion chip 16 and the VGA port 17.

As described above, in the information processing device according to the present modification, the dummy resistor is manually connected with the path extending from the DP-to-VGA conversion chip when no analog display is connected at update of the firmware of the DP-to-VGA conversion chip. Accordingly, the information processing device performs pseudo detection of an analog display, and updates the firmware of the DP-to-VGA conversion chip. In this manner, with the configuration in which the dummy resistor is manually connected, it is possible to omit work of connecting an analog display to the information processing device at update of the firmware of the DP-to-VGA conversion chip. In other words, it is possible to reduce the operator's work at update of the firmware.

Second Embodiment

Figure 5:
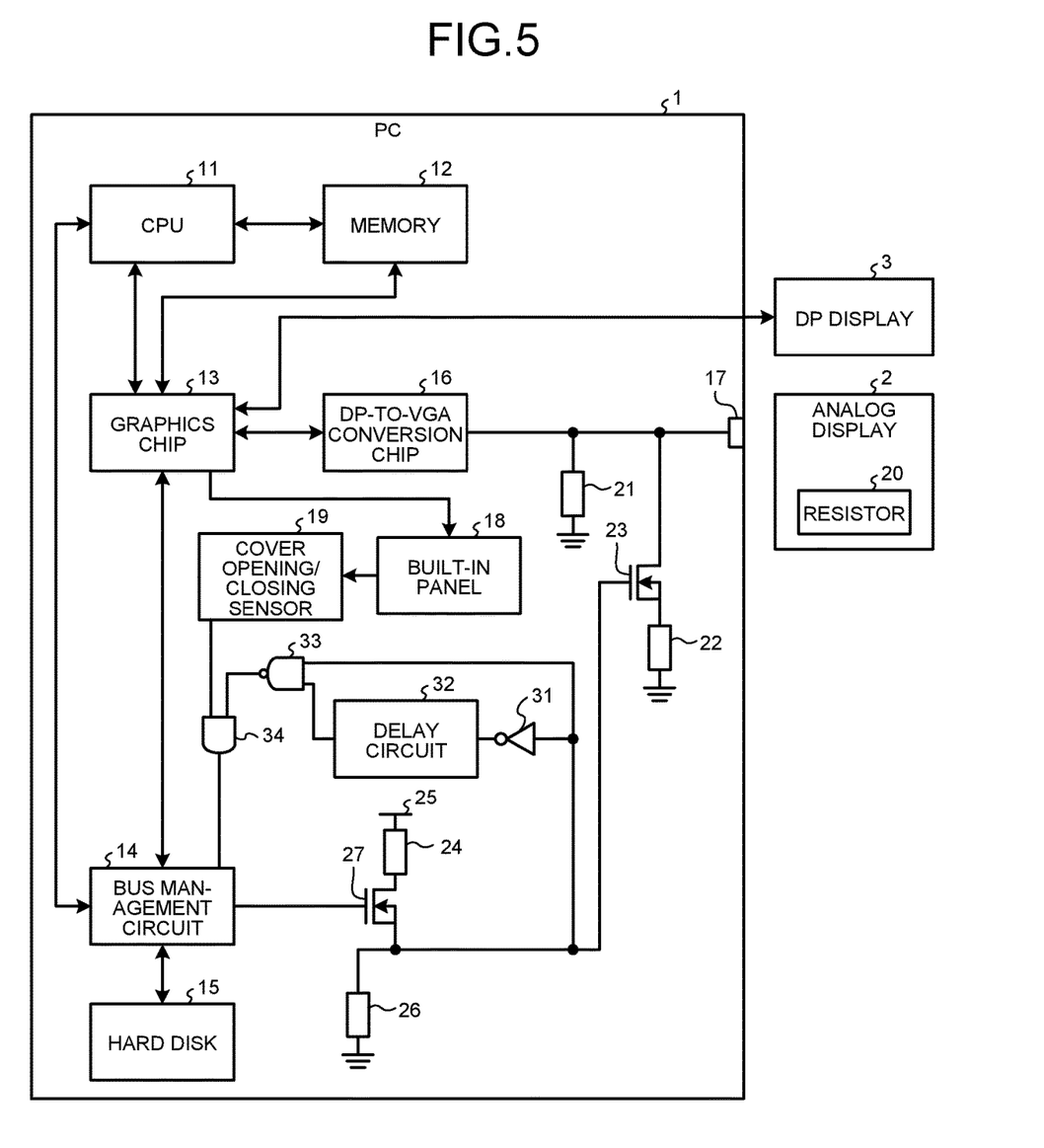
FIG. 5 is a block diagram of an information processing device according to a second embodiment.

FIG. 5 is a block diagram of an information processing device according to a second embodiment. The PC 1 according to the present embodiment is different from that of the first embodiment in that a display screen is automatically moved to the built-in panel 18. Each component in FIG. 5 denoted by a reference sign same as that in FIG. 1 has a function same as that in the first embodiment unless otherwise stated. The function of each component same as that in the first embodiment will not be described below.

The path extending from the gate of the FET switch 23 is connected with one of input terminals of a NAND circuit 33 and an input terminal of an inverting circuit 31.

The inverting circuit 31 receives input of a signal having a voltage level applied to the gate of the FET switch 23. Then, the inverting circuit 31 inverts the voltage level of the input signal and outputs the signal to a delay circuit 32.

In the normal mode before an instruction to update the firmware of the DP-to-VGA conversion chip 16 is input, the FET switch 27 is off, and the voltage level applied to the gate of the FET switch 23 is Low. In this case, a signal having a Low value is input to the inverting circuit 31. Then, the inverting circuit 31 outputs a signal having a High value.

When the operation mode is transitioned to the firmware update mode, the FET switch 27 is on, and the voltage level applied to the gate of the FET switch 23 is High. In this case, a signal having the High value is input to the inverting circuit 31. Then, the inverting circuit 31 outputs a signal having the Low value.

When the operation mode is returned to the normal mode after completion of the firmware update, the FET switch 27 is off, and the voltage level applied to the gate of the FET switch 23 is Low. In this case, a signal having the Low value is input to the inverting circuit 31. Then, the inverting circuit 31 outputs a signal having the High value.

The delay circuit 32 receives, from the inverting circuit 31, input of a signal having a voltage level opposite to the voltage level applied to the gate of the FET switch 23. Then, the delay circuit 32 provides a predetermined delay to the input signal. As described above, the CPU 11 switches the display screen to the built-in panel 18 when the cover is opened after the predetermined time has elapsed since the analog display 2 is connected. Thus, the delay circuit 32 provides a delay equal to or longer than the predetermined time to the signal. In the present embodiment, the CPU 11 switches the display screen to the built-in panel 18 when the cover is opened after one second or longer has elapsed since the analog display 2 has been connected. In this manner, in the present embodiment, the delay circuit 32 provides the predetermined delay of one second to the signal. Thereafter, the delay circuit 32 inputs the signal provided with the delay of one second to the other input terminal of the NAND circuit 33.

The one terminal of the NAND circuit 33 is connected with the path extending from the gate of the FET switch 23. The other terminal of the NAND circuit 33 is connected with an output terminal of the delay circuit 32.

The signal having the voltage level applied to the gate of the FET switch 23 is input to the one terminal of the NAND circuit 33. The signal obtained by providing the delay of one second to the signal having the voltage level opposite to the voltage level applied to the gate of the FET switch 23 is input to the other terminal of the NAND circuit 33. Then, the NAND circuit 33 outputs, to an AND circuit 34, the negative AND of the signal having the voltage level applied to the gate of the FET switch 23 and the signal obtained by providing the delay of one second to the signal having the voltage level opposite to the voltage level applied to the gate of the FET switch 23.

In the normal mode before an instruction to update the firmware of the DP-to-VGA conversion chip 16 is input, a signal having the Low value is input to the NAND circuit 33 as the signal having the voltage level applied to the gate of the FET switch 23. In addition, the NAND circuit 33 receives input of a signal having the High value with one second delay from the delay circuit 32. In this case, the NAND circuit 33 outputs a signal having the High value.

When the operation mode is transitioned to the firmware update mode, a signal having the High value is input to the NAND circuit 33 as the signal having the voltage level applied to the gate of the FET switch 23. For one second after the transition to the firmware update mode, the NAND circuit 33 receives input of a signal having the High value from the delay circuit 32. In this case, the NAND circuit 33 outputs a signal having the Low value. After one second has elapsed since the transition to the firmware update mode, the NAND circuit 33 receives input of a signal having the Low value from the delay circuit 32. In this case, the NAND circuit 33 outputs a signal having the High value.

When the operation mode is returned to the normal mode after completion of the firmware update, a signal having the Low value is input to the NAND circuit 33 as the signal having the voltage level applied to the gate of the FET switch 23. For one second after the transition to the normal mode, the NAND circuit 33 receives input of a signal having the Low value from the delay circuit 32. In this case, the NAND circuit 33 outputs a signal having the High value. After one second has elapsed since the transition to the normal mode, the NAND circuit 33 receives input of a signal having the High value from the delay circuit 32. In this case, the NAND circuit 33 outputs a signal having the High value.

The AND circuit 34 is disposed on a path through which a signal output from the cover opening/closing sensor 19 is input to the bus management circuit 14. A signal output from the cover opening/closing sensor 19 is input to one input terminal of the AND circuit 34. A signal output from the NAND circuit 33 is input to the other input terminal of the AND circuit 34.

The AND circuit 34 outputs, to the bus management circuit 14, the AND of the signal output from the cover opening/closing sensor 19 and the signal output from the NAND circuit 33.

When the cover is open, the AND circuit 34 receives, from the cover opening/closing sensor 19, input of a signal having the High value as a signal indicating that the cover is open. When the cover is closed, the AND circuit 34 receives, from the cover opening/closing sensor 19, input of a signal having the Low value as a signal indicating that the cover is closed.

Then, to the AND circuit 34, a signal having the Low value is input from the NAND circuit 33 only for one second after transition to the firmware update mode, and a signal having the High value is input from the NAND circuit 33 at the other timing.

In other words, upon transition to the firmware update mode while the cover is open, the voltage level of a signal output from the AND circuit 34 changes from High to Low, and then returns to High one second later.

Upon transition to the firmware update mode while the cover is closed, the voltage level of a signal output from the AND circuit 34 remains at Low. However, in such a case, the operator opens the cover to check the display screen. When the cover is opened, a signal having the High value is input from the cover opening/closing sensor 19 to the AND circuit 34. Then, the AND circuit 34 outputs a signal having the High value since a signal having the High value is input from the NAND circuit 33. In this case, the CPU 11 receives a cover open notification from the bus management circuit 14. In this case, the CPU 11 determines that the built-in panel 18 is newly added, and moves the display screen to the built-in panel 18.

The bus management circuit 14 detects cover open in one second after firmware update is started and the graphics chip 13 determines that the analog display 2 is connected. Accordingly, the bus management circuit 14 notifies the CPU 11 that the cover is opened one second after pseudo connection of the analog display 2 is determined.

The CPU 11 receives a notification of connection of the analog display 2 from the graphics chip 13 before firmware update is started. Thereafter, after one second or longer has elapsed, the CPU 11 receives a cover open notification from the bus management circuit 14. In this case, the CPU 11 determines that the built-in panel 18 is newly added, and notifies the graphics chip 13 of outputting a video signal to the built-in panel 18.

When having detected non-connection of the analog display 2, the graphics chip 13 notifies the bus management circuit 14 of non-detection of the analog display 2. Thereafter, the graphics chip 13 receives a notification of completion of transition to the firmware update mode from the bus management circuit 14, and detects connection of the analog display 2. Then, the graphics chip 13 notifies the CPU 11 of the connection of the analog display 2. In addition, the graphics chip 13 outputs a video signal to the analog display 2, which is actually not connected.

Thereafter, the graphics chip 13 receives, from the CPU 11, output of a video signal to the built-in panel 18. Then, the graphics chip 13 outputs the video signal to the built-in panel 18. In the present embodiment, the graphics chip 13 stops the video signal output to the analog display 2, and outputs the video signal only to the built-in panel 18. However, the present invention is not limited thereto, and the graphics chip 13 may display a duplicate screen of the analog display 2 on the built-in panel 18 or may display an extension screen of the analog display 2 on the built-in panel 18.

Thereafter, the graphics chip 13 executes the processing of updating the firmware of the DP-to-VGA conversion chip 16 in accordance with an input from the operator through the update operation screen displayed on the built-in panel 18.

Figure 6:
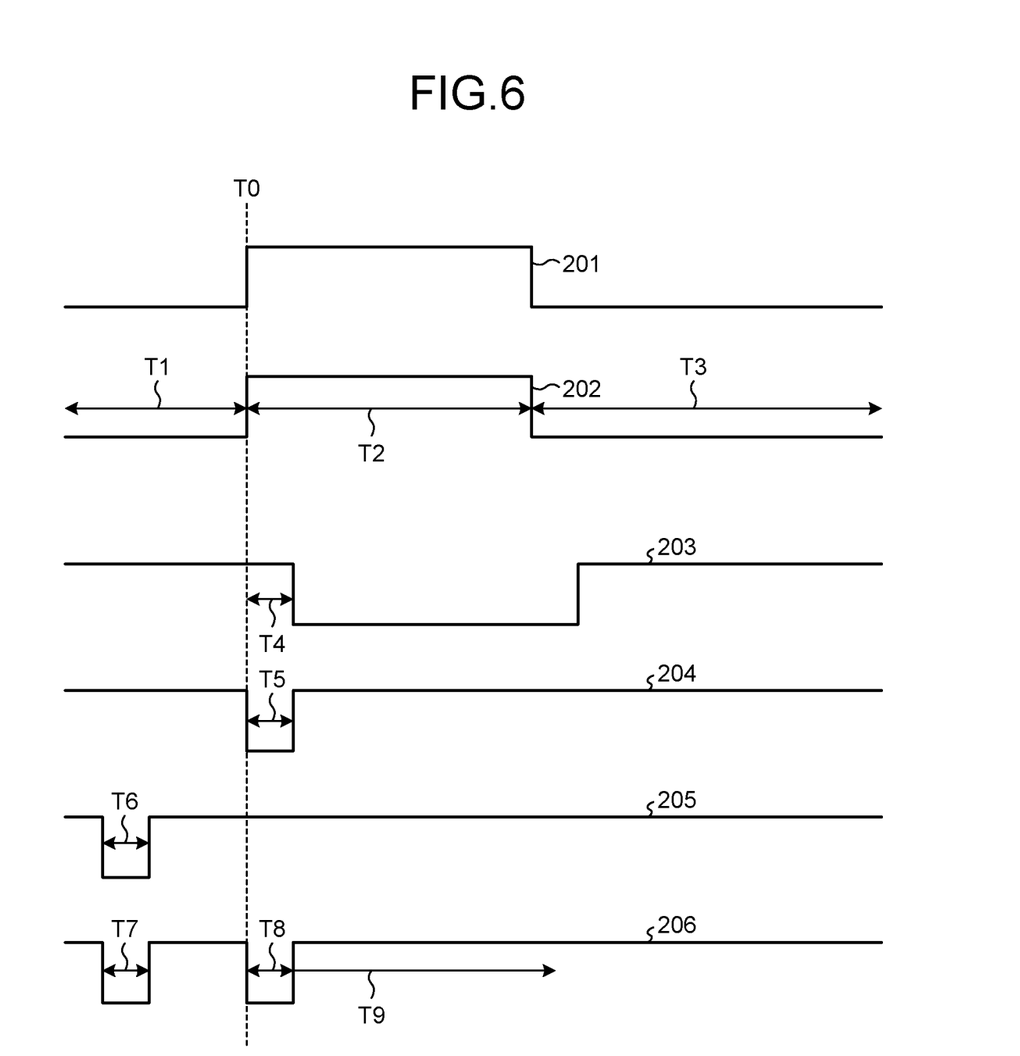
FIG. 6 is a timing chart of signals used to transfer a display screen to a built-in panel.

The following describes transition of signals used to transfer the display screen to the built-in panel 18, which is added in the present embodiment, with reference to FIG. 6. FIG. 6 is a timing chart of each signal used to transfer the display screen to the built-in panel.

Graph 201 illustrates transition of the voltage level of a mode switching signal, in other words, a signal output from the bus management circuit 14 to the gate of the FET switch 27. Graph 202 illustrates transition of the voltage level of a signal applied to the gate of the FET switch 23, in other words, a signal input to each of the inverting circuit 31 and the NAND circuit 33. Graph 203 illustrates transition of the voltage level of a signal output from the delay circuit 32. Graph 204 illustrates transition of the voltage level of a signal output from the NAND circuit 33. Graph 205 illustrates transition of the voltage level of a signal output from the cover opening/closing sensor 19. Graph 206 illustrates transition of the voltage level of a signal output from the AND circuit 34. In Graphs 201 to 206, time elapses in the right direction.

As illustrated with Graph 201, the operation mode of the PC 1 is switched from the normal mode to the firmware update mode by the bus management circuit 14 at time T0. In other words, at time T0, High voltage is applied to the gate of the FET switch 27 to turn on the FET switch 27.

At time T0 when the FET switch 27 is turned on, High voltage is applied to the gate of the FET switch 23 to turn on the FET switch 23. Thereafter, after elapse of Duration T2, firmware update is completed, and the gate voltage of the FET switch 23 becomes Low so that the FET switch 23 is turned off. Specifically, in Duration T1, the DP-to-VGA conversion chip 16 detects the resistance of the resistance value of the path connected with the VGA port 17 to be 75Ω. In Duration T2, the DP-to-VGA conversion chip 16 detects the resistance of the resistance value of the path connected with the VGA port 17 to be 37.5Ω. In Duration T3, the DP-to-VGA conversion chip 16 detects the resistance of the resistance value of the path connected with the VGA port 17 to be 75Ω.

As illustrated with Graph 203, the voltage level of a signal output from the delay circuit 32 changes from High to Low after Duration T4 as elapsed since time T0 when transition is made to the firmware update mode. In the present embodiment, Duration T4 is one second.

Before transition to the firmware update mode, the NAND circuit 33 outputs a signal having the High value. Then, the NAND circuit 33 outputs a signal having the Low value for Duration T5 after time T0 when transition is made to the firmware update mode, in other words, for one second. Thereafter, the NAND circuit 33 outputs a signal having the High value.

After the cover is opened and closed, the cover opening/closing sensor 19 outputs a signal having the Low value as illustrated in Duration T6 of Graph 205 while the cover is closed. The cover opening/closing sensor 19 outputs a signal having the High value while the cover is open.

When the cover is closed in the normal mode, the AND circuit 34 outputs a signal having the Low value while the cover is closed as illustrated in Duration T7 of Graph 206. The AND circuit 34 outputs a signal having the High value while the cover is opened in the normal mode.

Then, upon transition to the firmware update mode, the AND circuit 34 outputs a signal having the Low value, and then outputs a signal having the High value after elapse of Duration T8. Duration T8 is equal to Duration T4, and is one second. Specifically, when the screen display setting at the previous update is the single screen display, a video signal is transferred to the analog display 2 in Duration T8. Then, in Duration T9, a video signal is transferred to the built-in panel 18 and the update operation screen is displayed on the built-in panel 18. Accordingly, the operator can perform an operation to update the firmware of the DP-to-VGA conversion chip 16.

Figure 7:
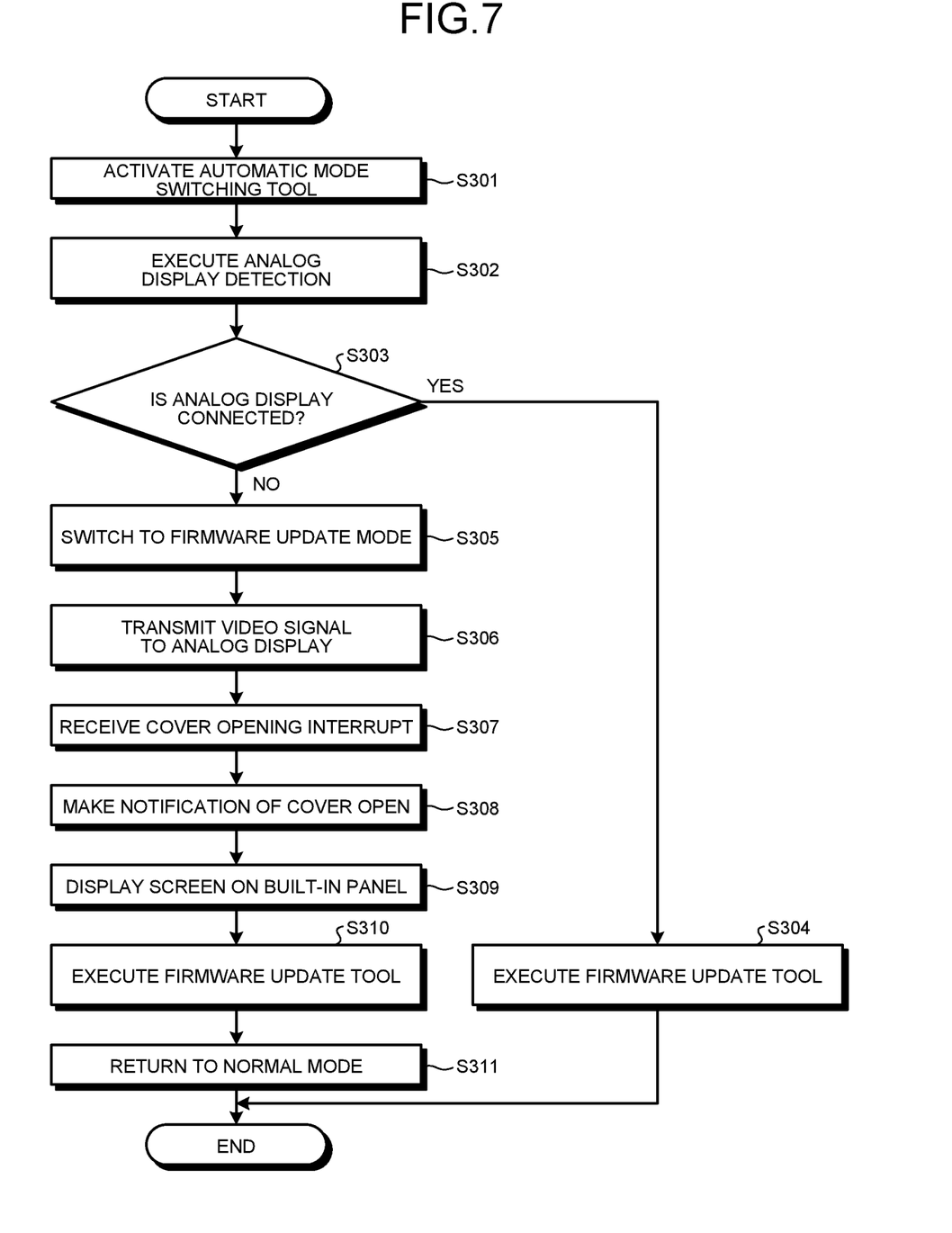
FIG. 7 is a flowchart of processing of updating firmware of the DP-to-VGA conversion chip according to the second embodiment.

The following describes, with reference to FIG. 7, the processing process of updating the firmware of the DP-to-VGA conversion chip 16 by the PC 1 according to the embodiment. FIG. 7 is a flowchart of the processing of updating the firmware of the DP-to-VGA conversion chip according to the second embodiment.

The CPU 11 receives an instruction to update the firmware of the DP-to-VGA conversion chip 16 from the operator. Then, the CPU 11 activates the automatic mode switching tool (step S301), and instructs the bus management circuit 14 to execute the automatic mode switching. Thereafter, the CPU 11 outputs a command to update the firmware of the DP-to-VGA conversion chip 16 to the graphics chip 13.

The graphics chip 13 receives input of the command to update the firmware of the DP-to-VGA conversion chip 16 from the CPU 11. Then, the graphics chip 13 executes EnumAttachableDevices Method to execute detection of the analog display 2 (step S302).

The graphics chip 13 determines whether the analog display 2 is connected based on whether the response indicating the connection of the analog display 2 is received (step S303). When the analog display 2 is connected (positive determination at step S303), the graphics chip 13 issues a display ID as a DWORD identifier to the analog display 2. Then, the graphics chip 13 executes the firmware update tool by using the issued display ID (step S304).

When the analog display 2 is not connected (negative determination at step S303), the graphics chip 13 notifies the bus management circuit 14 of the non-connection of the analog display 2. The bus management circuit 14 receives the notification of the non-connection of the analog display 2 from the graphics chip 13. Then, the bus management circuit 14 applies voltage to the gate of the FET switch 27 and switches the operation mode of the PC 1 to the firmware update mode (step S305). Thereafter, the bus management circuit 14 notifies the graphics chip 13 of the switching to the firmware update mode.

The graphics chip 13 receives the notification of the switching to the firmware update mode from the bus management circuit 14. Then, the graphics chip 13 executes the EnumAttachableDevices Method again to execute detection of the analog display 2. Then, the graphics chip 13 receives, from the DP-to-VGA conversion chip 16, input of a response indicating the notification of the connection of the analog display 2. The graphics chip 13 notifies the CPU 11 of the connection of the analog display 2. In addition, in this case, although the analog display 2 is actually not connected with the VGA port 17, the graphics chip 13 determines that the analog display 2 is connected, and transmits a video signal to the analog display 2 (step S306).

The bus management circuit 14 receives interrupt of cover open from the AND circuit 34 one second after the gate voltage application to the FET switch 27 (step S307).

The bus management circuit 14 notifies the CPU 11 of the cover open (step S308). The CPU 11 receives the cover open notification, and instructs the graphics chip 13 to output a video signal to the built-in panel 18.

The graphics chip 13 receives, from the CPU 11, the instruction to output a video signal to the built-in panel 18. Then, the graphics chip 13 outputs a video signal to the built-in panel 18 to display the update operation screen on the built-in panel 18 (step S309). Thereafter, the operator inputs an instruction to update the firmware of the DP-to-VGA conversion chip 16 by using the update operation screen.

The graphics chip 13 receives the instruction to update the firmware of the DP-to-VGA conversion chip 16, and executes the firmware update tool (step S310).

Thereafter, the graphics chip 13 notifies the bus management circuit 14 that the update of the firmware of the DP-to-VGA conversion chip 16 is completed. The bus management circuit 14 receives, from the graphics chip 13, the notification that the update of the firmware of the DP-to-VGA conversion chip 16 is completed. Then, the bus management circuit 14 stops the voltage application to the gate of the FET switch 27. Accordingly, the FET switch 27 is turned off so that the pull-up power source 25 is disconnected from the path extending from the gate of the FET switch 23, and the gate voltage of the FET switch 23 decreases to the voltage of the ground. Then, the FET switch 23 is turned off so that the dummy resistor 22 is disconnected from the path connecting the DP-to-VGA conversion chip 16 and the VGA port 17. In other words, the bus management circuit 14 returns the operation mode of the PC 1 to the normal mode (step S311).

As described above, the information processing device according to the present embodiment performs screen display on the built-in panel after transition to the firmware update mode. Accordingly, the state of no operation screen display is avoided, and the operator can easily and reliably perform firmware update without manually performing screen switching. In other words, it is possible to further reduce the operator's work at firmware update.

Third Embodiment

Figure 8:
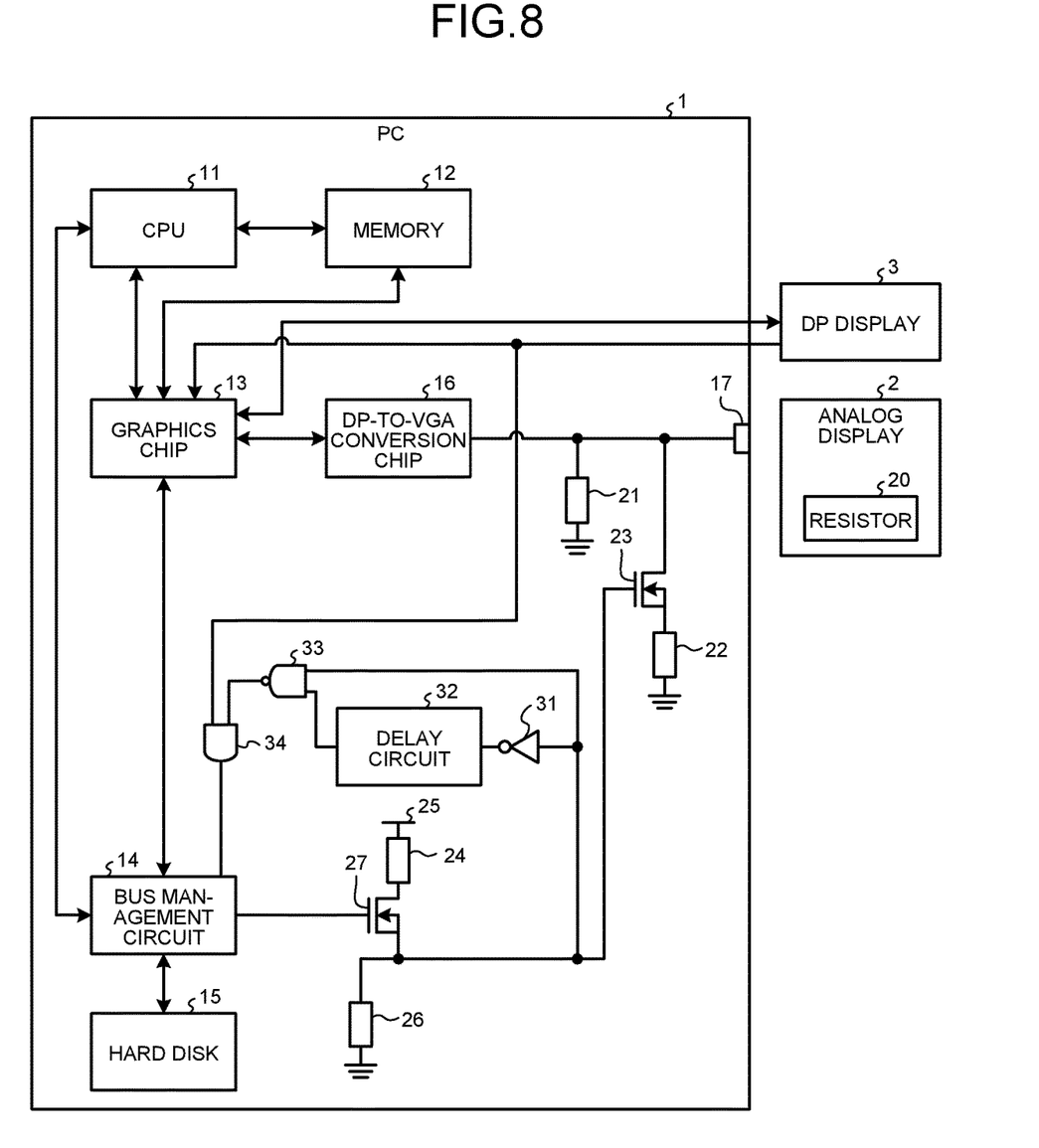
FIG. 8 is a block diagram of an information processing device according to a third embodiment.

FIG. 8 is a block diagram of an information processing device according to a third embodiment. The third embodiment describes a case in which the information processing device is a desktop personal computer (PC). Each component in FIG. 8 denoted by a reference sign same as that in FIG. 5 has a function same as that in the second embodiment unless otherwise stated. The function of each component same as that in the second embodiment will not be described below.

The PC 1 according to the present embodiment, which is a desktop PC, includes no built-in display. Thus, it is difficult to perform display on a display device other than the analog display 2 by using a cover opening signal. Thus, another method is employed to display the operation screen on the DP display 3.

The DP display 3 includes a path through which a signal notifying information on the DP display 3 is transmitted to the graphics chip 13 by using a hot plug signal and a display data channel (DDC) for notifying connection of the DP display 3 to the PC 1. When connected with the PC 1, the DP display 3 outputs a hot plug signal having the High value to the graphics chip 13. The AND circuit 34 has one end connected with the path through which the DP display 3 transmits the hot plug signal to the graphics chip 13.

The bus management circuit 14 receives input of the hot plug signal having the High value from the AND circuit 34 one second after the FET switch 27 is turned on. Accordingly, the bus management circuit 14 recognizes the connection of the DP display 3. Then, the bus management circuit 14 notifies the CPU 11 of the connection of the DP display 3.

The CPU 11 receives a notification of connection of the analog display 2 from the graphics chip 13 after the PC 1 is transitioned to the firmware update mode. Then, after one second or longer has elapsed, the CPU 11 receives the notification of the connection of the DP display 3 from the bus management circuit 14. Having received the notification of the connection of the DP display 3, the CPU 11 determines whether one second or longer has elapsed after the connection of the analog display 2. When one second or longer has elapsed, the CPU 11 outputs, to the graphics chip 13, an instruction to output a video signal to the DP display 3.

When having detected non-connection of the analog display 2, the graphics chip 13 notifies the bus management circuit 14 of the non-detection of the analog display 2. Thereafter, the graphics chip 13 receives a notification of completion of transition to the firmware update mode from the bus management circuit 14, and detects connection of the analog display 2. Then, the graphics chip 13 notifies the CPU 11 of the connection of the analog display 2. In addition, the graphics chip 13 outputs a video signal to the analog display 2, which is actually not connected.

Thereafter, the graphics chip 13 receives, from the CPU 11, output of a video signal to the DP display 3. Then, the graphics chip 13 outputs a video signal to the DP display 3.

Thereafter, the graphics chip 13 executes the processing of updating the firmware of the DP-to-VGA conversion chip 16 in accordance with an input from the operator through the update operation screen displayed on the DP display 3.

As described above, the information processing device according to the present embodiment performs screen display on an externally connected DP display after transition to the firmware update mode. Accordingly, when no built-in panel is included, the state of no operation screen display is avoided, and the operator can easily and reliably perform firmware update without manually performing screen switching. In other words, it is possible to further reduce the operator's work at firmware update.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. An information processing device comprising:
a convertor that:

includes a path that connects with a first display device, executes a control program to convert an input video signal as a digital signal into an analog signal and output the converted signal, and when having received a first notification querying for a connection state of the first display device and when having detected a resistance value corresponding to a state where the first display device is connected on the path, transmits a second notification that the first display device is connected;

a display controller that:

outputs the video signal as the digital signal to the convertor, transmits the first notification to the convertor when having received an instruction to update the control program, and updates the control program when having received, from the convertor, the second notification as a response to the transmitted first notification; and a resistance changer that connects a dummy resistor to the path and causes the path to have the resistance value corresponding to the state where the first display device is connected when the convertor has received the first notification and does not detect the resistance value corresponding to the state where the first display device is connected on the path.

2. The information processing device according to claim 1, wherein, when the resistance value corresponding to the state where the first display device is connected is not detected on the path by the convertor, the display controller transmits the first notification to the convertor again after the dummy resistor is connected to the path by the resistance changer.

3. The information processing device according to claim 1, further comprising:

a second display device, wherein when updating the control program, the display controller outputs to the second display device, the video signal output to the convertor, and causes the second display device to display video.

4. A method of controlling an information processing device including a path that connects with a first display device, a conversion circuit that executes a control program to convert an input video signal as a digital signal into an analog signal and output the converted signal, a display control circuit that outputs the video signal as the digital signal to the conversion circuit, and a management circuit that manages a resistance value of the path, the method comprising:

transmitting, by the display control circuit, a first notification querying for a connection state of the first display device to the conversion circuit when having received an instruction to update the control program;

detecting, by the conversion circuit, the resistance value of the path when having received the first notification;

connecting, by the management circuit, a dummy resistor to the path and causes the path to have a resistance value corresponding to a state where the first display device is connected when the conversion circuit has received the first notification and does not detect the resistance value corresponding to the state where the first display device is connected on the path, and detecting, by the conversion circuit, the resistance value of the path again;

notifying, by the conversion circuit, the display control circuit of a second notification that the first display device is connected when the resistance value corresponding to the state where the first display device is connected is detected on the path; and updating, by the display control circuit, the control program when having received the second notification.

* * * * *